United States Patent [19]

Paweletz

[11] Patent Number: 5,535,582
[45] Date of Patent: Jul. 16, 1996

[54] DRIVE FOR A SHAFTLESS SPINNING ROTOR OF AN OPEN END SPINNING MACHINE

[75] Inventor: Anton Paweletz, Fellbach, Germany

[73] Assignee: SKF Textilmaschinen-Komponenten GmbH, Stuttgart, Germany

[21] Appl. No.: 404,370

[22] Filed: Mar. 15, 1995

[30] Foreign Application Priority Data

Mar. 15, 1994 [DE] Germany ............................ 34 44 625.7
Mar. 23, 1994 [DE] Germany ............................ 44 09 992.4

[51] Int. Cl.$^6$ .............................. D01H 4/00; H02K 7/00
[52] U.S. Cl. ..................... 57/414; 57/92; 57/404; 57/406; 310/67.00 R; 310/90.500
[58] Field of Search ................. 57/92, 404, 406, 57/414; 310/67 R, 90.5

[56] References Cited

U.S. PATENT DOCUMENTS

| | | | |
|---|---|---|---|
| 3,885,839 | 5/1975 | Habermann | 310/90.5 |
| 4,076,340 | 2/1978 | Meinke et al. | 310/90.5 |
| 4,519,205 | 5/1985 | Gubler | 57/406 |
| 4,543,780 | 10/1985 | Muller et al. | 57/406 |
| 5,250,865 | 10/1993 | Meeks | 310/90.5 |

FOREIGN PATENT DOCUMENTS

| | | |
|---|---|---|
| 2433712 | 1/1975 | Germany . |
| 4104251A1 | 8/1992 | Germany . |
| 4207673 | 3/1993 | Germany . |
| 359313 | 1/1973 | U.S.S.R. . |
| 1687660 | 10/1991 | U.S.S.R. . |
| 1509952 | 7/1975 | United Kingdom . |
| WO92/01096 | 1/1992 | WIPO . |

*Primary Examiner*—William Stryjewski
*Attorney, Agent, or Firm*—Shefte, Pinckney & Sawyer

[57] ABSTRACT

A drive for a shaftless spinning rotor wherein the spinning rotor is embodied as the rotor of an axial field motor utilizes axially opposed yoke-forming, magnetically conductive elements disposed respectively on the opposite sides of an air gap formed between the spinning rotor and the stator in combination with at least one magnet (preferably either permanent magnets or electromagnets) on one or both the rotor and stator arranged concentrically to one another and to the rotor axis. The present magnet/yoke arrangement does not require exact mutual alignment of oppositely located magnets nor their homogeneous polarization. The present arrangement is self-adjusting because of the generation of a point-symmetrical field which in operation forms a sort of magnetic potential depression. Magnetic drive and guide fields are advantageously decoupled in order to reduce their mutual interference.

13 Claims, 2 Drawing Sheets

5,535,582

1

DRIVE FOR A SHAFTLESS SPINNING ROTOR OF AN OPEN END SPINNING MACHINE

FIELD OF THE INVENTION

The present invention relates to a motor drive for a shaftless spinning rotor of an open end spinning machine embodied as the rotor of an axial field motor, wherein a combined magnetic/gas bearing having a concentric disposition of magnets produces magnetic driving and guiding fields and maintains a bearing or support surface facing outwardly from the rotor and an oppositely located bearing or support surface on the stator spaced apart by an air gap, with means being provided for guiding or conducting the magnetic flux for the magnetic drive and guide fields.

BACKGROUND OF THE INVENTION

As development of rotor spinning machines progresses, the goal is not only to improve the quality of the yarns produced, but above all to increase production capacity. A key factor in increasing production capacity is the rotary speed of the spinning rotor. For this reason, varied kinds of drives and bearings for spinning rotors have been developed, in order to reach rotary speeds of markedly over 100,000 rpm. Reducing the rotor diameter and mass and lowering friction losses enables not only greater rotary speed but also reduced energy consumption when driven.

In this respect, a shaftless spinning rotor, which is embodied as the rotor of an axial field motor, can be considered especially advantageous by providing a combined magnetic and gas bearing which assures relatively low friction losses.

A shaftless open-end spinning rotor of the above-described type having a combined magnetic and gas bearing is known from International PCT Patent Reference WO 92/01096, which discloses a rotor having a bearing face, remote from the spinning chamber of the spinning rotor, and means for conducting the magnetic flux for the driving and guiding magnetic field. By means of the guiding magnetic field, the rotational axis of the open-end spinning rotor is to be rigidly defined and maintained during rotation. However, it has been found impossible to achieve significant suppression of impermissible vibratory, wobbling and oscillating motions that occur particularly in critical rpm ranges.

Permanent magnets located opposite each other in the rotor and the stator and having facing magnetic poles of reversed polarity are provided for generating the magnetic guide field. However, irregularities in the dimensions and in the magnetization of these magnets often occur in the stator and the rotor, which lead to deviations in magnetic induction and inhomogeneities in magnetic flux distribution and thereby can cause a radial mismatch between the magnetic axis of symmetry and the axis of rotation through the center of gravity of the rotor. Further, it is also possible that opposite actions of two concentric magnetic systems in the rotor and stator can cause radial oscillations of the rotor and output losses. Further disadvantages of the known construction lie in the production expense caused by the necessity of extremely accurate dimensioning and exact positioning required of the magnets in the stator and rotor, typically performed by means of an elaborate gluing process. Furthermore, the disposition of permanent magnets in the rotor causes problems in that on the one hand the bearing face of the rotor should have very little roughness, but on the other hand, when permanent magnets are disposed in the bearing face, mechanical finishing of this surface in the form of grinding and polishing is made very difficult without mechanical destruction or demagnetization of the magnets because of the resulting effects of temperature.

SUMMARY OF THE INVENTION

It is therefore an object of the present invention to improve the known motor drive of a shaftless spinning rotor for an open end spinning machine by providing a simplified construction and an improved running smoothness and quietness.

Briefly summarized, the foregoing objective may be accomplished in accordance with the present invention in a rotor assembly for an open end spinning machine of the type comprising an axial field motor having a rotor and a stator wherein the rotor includes a body defining an interior spinning chamber and an outward bearing face and the stator includes a bearing face disposed opposite the bearing face of the rotor, by providing the present improved means for producing a combined magnetic and gas bearing for supporting the rotor at a spacing relative to the stator defined by an intervening air gap. Under the present invention, the bearing means includes means for producing a first field of magnetic flux for guiding or orienting and maintaining a rotational axis of the rotor in a stationary disposition, means for producing a second field of magnetic flux for driving rotation of the rotor about the axis, first means for conducting the magnetic flux for the guiding or orienting magnetic field, and second means for conducting the magnetic flux for the driving magnetic field. In accordance with the present invention, the means for producing a first field of magnetic flux comprises a magnet disposed on one of the rotor and the stator concentrically to the axis and the first magnetic flux conducting means comprises a yoke-forming, magnetically conductive element disposed on the other of the rotor and the stator in axially opposed facing relation to the magnet.

Because of the disposition of one or more magnets for the magnetic guide field opposite a magnetically conductive element forming a yoke, instead of the conventional use of a further magnet of opposite polarity, a point-symmetrical field is generated which, in operation, forms a sort of a magnetic potential depression which acts in a self-adjusting manner. In particular, it is no longer necessary to exactly align the magnets to be facing each other in the stator and rotor nor to magnetize them evenly. In this connection, it will be understood that an absolutely homogeneous magnetization is technically difficult or nearly impossible, at least not without extremely great expense.

In the preferred embodiment, a generally non-magnetic means is disposed between the first and second magnetic flux conducting means for decoupling of the respective magnetic fluxes. This is of importance mainly because the magnetic drive field typically located outwardly of the guide field will have a chronologically and spatially changing magnetic force component which disturbs the constant magnetic guide field, whereby the superimposition of the drive field on the guide field could result in an asymmetric field strength distribution at the center of the spinning rotor. For example, while the magnetic field lines between the drive magnets of a brushless DC-motor extend in the same direction over the central area in which the guide magnets are disposed, the direction of the magnetic guide field lines is opposite on opposite sides of the axis of rotation. As a result, a jam in the magnetic flux occurs on the one side, possibly even magnetic satiation, while an oppositely-directed mutual weakening of the magnetic field occurs on the opposite side. Without a separation of the magnetic flux of the magnetic drive and guide fields the effect of the stator current leads to a constant magnetic reversal in the area of the guide magnet(s) or the yoke-forming magnetically conductive elements.

The embodiment of the yoke-forming magnetically conductive element to be of a soft magnetic material has the advantage that this material has a high degree of permeability. If the soft magnetic material additionally has a large hysteresis loop, it is possible to provide yoke-forming elements which, on the one hand, have good adaptability to the field of the oppositely located permanent magnet and, on the other hand, have a storage capacity for magnetic energy resulting in an increase of the effect of the oppositely located magnetic field. Further, the formation of the yoke-forming magnetically conductive element with an annular recess concentric to the rotor axis and opening to the respective rotor or stator bearing face permits the direction of formation of the magnetic guide field to be targeted, especially if yoke-forming magnetically conductive elements are provided on both the stator and the rotor with respective recesses which are axially aligned with each other, with the result of very good centering of the rotor.

Several alternative embodiments are contemplated under the present invention, all of which assure the essential advantages of the invention. In one embodiment, the magnet is inserted within one of the recesses at an inward spacing from the location at which it opens at the respective bearing face. In this case, this placement of the magnet away from the outer surface of the respective yoke-forming element offers the advantage that the magnet is no longer located at the bearing surface of the rotor or stator whereby mechanical finishing of these bearing faces is easily possible.

In some embodiments, a plurality of magnets may be employed, either disposed respectively on the rotor or the stator or both. In such cases, an improved centering of the rotor may be achieved by arranging the magnets in respect to their associated yoke-forming magnetically conductive elements to cause the respective magnetic fields to mutually reinforce each other.

It is also advantageous to arrange the magnet(s) for the magnetic guide field on the stator where they need not perform any rotary movements. A lessened need therefore exists for the secure fastening of the magnets. Furthermore, the magnetic field emanating from the magnets, which in actuality is not completely homogeneous as already mentioned above, does not move.

The magnet(s) may be permanent magnets or electromagnets and various considerations play a role in the decision whether to use permanent or electromagnets. A system with a large soft magnetic volume and electromagnetic coils has higher damping, while the employment of permanent magnets shows an increased resilience of the bearing. In comparison to the use of permanent magnets, the employment of electromagnetic coils permits a control of the magnetic centering force at critical rpm by means of a controlled current supply.

DETAILED DESCRIPTION OF THE PREFERRED EMBODIMENTS

Figure 1:
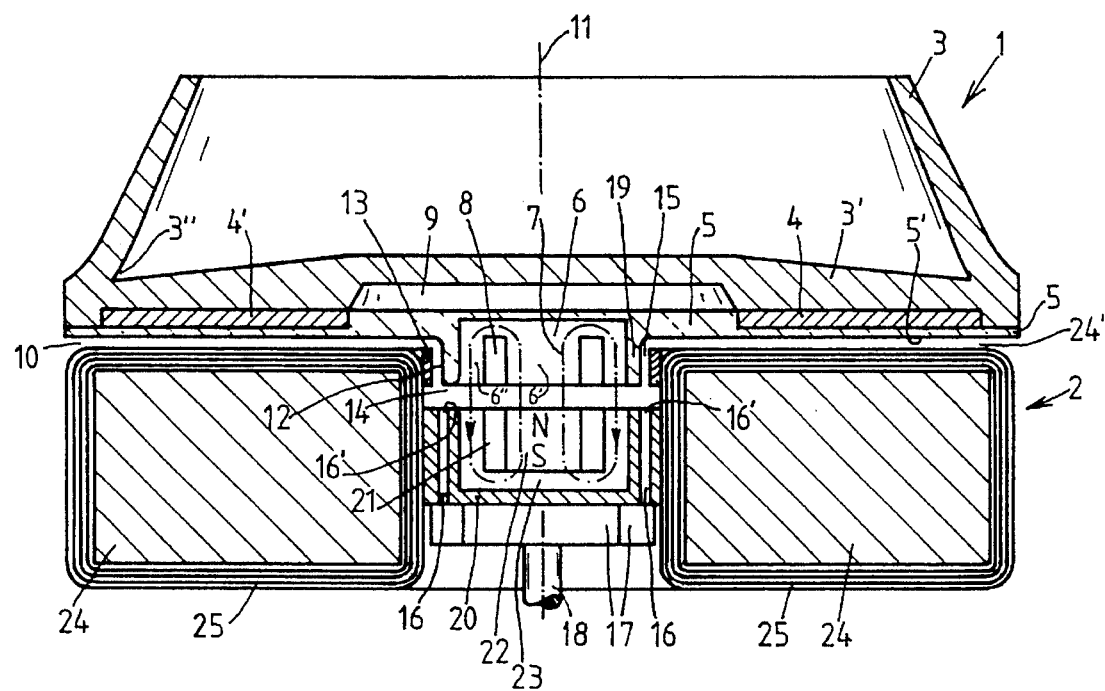
FIG. 1 is an axial cross-sectional view through an assembly of a shaftless open-end spinning rotor embodied as the rotor of an axial field motor, with a center-disposed permanent magnet of axial polarization on the stator side for generating a magnetic guide field, in accordance with one preferred embodiment of the present invention.

Referring now to the accompanying drawings and initially to FIG. 1, a shaftless spinning rotor 1 according to the present invention is embodied as the rotor of an axial field motor in assembly with a stator 2 of the motor. The main body of the spinning rotor i forms a spinning cup 3 open at its top with a circular disk-like base 3' from which an annular outer wall extends to define a spinning chamber therewithin with an annular fiber collecting groove 3" extending circumferentially at the juncture of the base 3' and the annular wall, this structure of the rotor 3 being concentric about and defining an axis of rotation 11. As is known in open-end spinning, opened individualized fibers are fed into the chamber to collect centrifugally in the groove 3" as a result of driven rotation of the rotor 3 and the collected fibers are progressively drawn from the spinning chamber to form a yarn or thread. The means by which fibers are delivered into the chamber and the means by which the yarn is withdrawn from the chamber are known but are not shown for the sake of simplicity in that elements do not have any influence on the subject of the present invention.

The underside of the rotor 1 and the opposing upper side of the stator 2 form respective bearing faces of a combined magnetic and gas bearing of the present invention. The bearing face of the rotor 1 includes a supporting and insulating carrier 5 which forms the main portion of the bearing face of the rotor 1 and serves to fasten a yoke 6 (for reasons of simplicity, the term "yoke" will be used in all exemplary embodiments to identify yoke-forming, magnetically conductive elements) coaxially to the underside of the spinning rotor 1 as a dynamically balanced unit by means of a central annular hub portion 19 of the carrier 5 projecting from the rotor 1 concentrically about its axis and encircling the yoke 6 to extend the hub 19 and the yoke 6 supported thereby into a correspondingly centered depression in the stator 2, forming an axial air gap 14 and a radial air gap 15 therebetween. The yoke 6 has a concentric, ring-shaped recess 8 in the form of a circumferential groove, whereby only a central portion 6' of the yoke radially inwardly of the recess 8 and an annular portion 6" located radially outwardly of the recess 8 form a part of the overall bearing face of the rotor in the motor drive assembly. As known from WO 92/01096, the carrier 5, including its hub portion 19, can be formed by rigid laminates which accomplish the function of a solid, and resilient support layer as well as the function of magnetic insulation.

A yoke 23 formed with a recess 21 similarly to the recess 8 in the yoke 6 is supported by the stator 2 axially adjacent the air gap 14 in facing relation to the yoke 6. However, instead of a central portion like the portion 6' of the yoke 6, an axially polarized permanent magnet 22 is provided at the center of the yoke element 23. As with the yoke 6 in the rotor 1, the yoke 23 is embedded in a support and insulating carrier 20. The yoke 23 and the yoke 6 function together to provide magnetic guidance for the rotor 1 as hereinafter described.

In addition to supporting the magnetic guide yoke 6 on the spinning cup 3 of the rotor 1, the above mentioned support and insulating carrier 5 also fastens to the base 3' of the cup 3 a plurality of drive magnets 4 and 4' which for example, consist of segment-shaped magnetic plates of alternating polarity arranged symmetrically about the axis of the rotor 1. Two drive magnets 4, 4' are sufficient in the simplest case and are magnetically insulated from each other in the plane of the bearing face by the carrier 5. However, since this magnet arrangement is already described in WO 92/01096, which is incorporated herein by reference, it need not be addressed in detail herein.

The base 3' of the spinning cup 3 directly serves as the yoke for the soft magnetic ground connection of the drive magnets 4, 4' and therefore the base 3' is made of a ferromagnetic material. The drive magnets 4 and 4' are affixed, e.g., by gluing, to the base 3'. The yoke 6 is axially spaced from the base 3' by an appropriately wide air gap 9 forming a barrier layer which is sufficient for decoupling the magnetic drive and guide fields from each other so that the yoke 6 is unaffected by the functioning of the base 3' as a yoke for the drive magnets 4 and 4'. As a result, the alternating component of the rotating magnetic drive field has no significant influence on the magnetic guide field.

The main component of the stator 2 is a stator winding 25 with an annular soft iron core 24. As already mentioned, the assembly of the yoke 23 and the magnet 22 to form the guide magnet field is mounted on the stator inside this annular assembly of the soft iron core 24 and stator winding 25. Air nozzles 16 open axially through the carrier 20 into the air gap 14 to inject air thereinto. The air nozzles 16 are supplied with air through an annular conduit 17 which communicates with a source of compressed air, not shown, via a connecting line 18. As a result of the outflowing air, the air gaps 14, 15 and an air gap 10 are always maintained appropriately between the spinning rotor 1 and stator 2 counter to the magnetic force of attraction of the magnets for averting direct contact between their opposed bearing faces. The air emerging from the air nozzles 16 flows from the axial gap 14 annularly into the radial gap 15 and outwardly therefrom radially through the air gap 10 between the rotor 1 and the stator 2, thereby achieving a uniform air cushion over the entire bearing face 5 of the rotor 1. The air pressure and air quantity should be adapted to the magnetic force so that, in the main bearing region, i.e., between the annular arrangement of the stator winding 25 and the opposite face 5 of the spinning rotor 3, the air gap 10 is maintained at a sufficient width. In this manner, the air consumption can be kept within feasible limits, and the magnetic interaction between the spinning rotor 1 and the stator 2 can be maximized, while achieving adequate security against direct contact of the bearing faces.

The air gap 14, which is somewhat wider than the air gap 10, prevents dimensional deviations in the magnet arrangements for the guide magnet field, resulting for instance from heating due to eddy currents induced by way of harmonics, from having any negative consequences on the operation of the rotor 1. Above all, however, it can be assured that the vulnerable nozzle arrangement of the air nozzles 16 is protected in the area of their outlet openings 16' in every case.

The radial air gap 15 is defined by two security faces 12, 13 formed respectively as wearproof surfaces on the radially outward surface of the carrier 19 and the radially inward surface of the stator 2, to be operative to serve the purpose of radially securing the position of the spinning rotor 1 both upon startup of the rotor 1 and particularly in case of suddenly occurring radial forces during operation, but not during trouble- free operation. These security faces 12, 13, advantageously consist of a sufficiently solid material, e.g., a ceramic material, to assure above all that the start-up security ring forming the face 12 is at least sufficiently strong and stable to prevent damage to the windings 25 of the stator. For example, the ring can be fastened by means of a laminate.

As seen in FIG. 1, the recesses 8 and 21 of the yokes 6 and 23 are axially aligned with and face one another, which serves to locate the portions of the yokes laterally adjacent these recesses directly opposite each other at a spacing defined by the relatively small air gap 14. In the embodiment of FIG. 1, the centered permanent magnet 22 of the yoke 23 and the centered portion of the yoke 6 are located opposite each other essentially along the axis of rotation of the rotor 1. Because of the specific configuration of the yokes 6 and 23, as well as the arrangement of the centered permanent magnet 22, a magnetic guide field results with magnetic flux lines 7 as represented by broken directional arrows in FIG. 1. As a result, the rotor assembly is magnetically maintained in a centered position at its rotational axis as soon as a minimum of potential energy of the described magnetic centering/guide field has been attained. This magnetic centering/guide system is therefore self-adjusting. Above all, the requirement existing in the prior art of accurately aligning respective guide magnets located opposite each other on the rotor and stator and the requirement of magnetizing the magnets evenly are avoided.

Since only one magnet is used in the present invention in contrast to the arrangement of several magnets in the prior art, this magnet should be correspondingly stronger in comparison with the known system to achieve an appropriate centering force. It is further preferred that a hysteresis material with a large proportion of cobalt be used as the material for the yokes. Also, it is contemplated that a hysteresis motor can be used in place of the illustrated motor with a drive magnet on the rotor side, without affecting the basic operation of the present invention.

For reasons of simplification, the further embodiments of the present invention are illustrated in FIGS. 2 to 6 only insofar as their particular arrangements for the design of the magnetic guide field, i.e., a magnetic field as generated by the guide magnet 22 and the yokes 6, 23 of FIG. 1, which accomplishes the combined functions of retaining the rotor 1 in assembly with the stator 2 and centering the rotor 1 coaxially with the stator 2. Furthermore, it is to be understood that the various embodiments of the present invention are not limited to a stepped bearing face, as shown by way of example in FIG. 1, but also relate to completely flat bearing faces, i.e., the invention can basically be employed independently of the design of the bearing faces.

Figure 2:
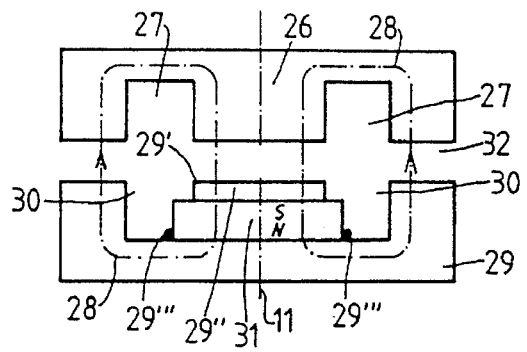
FIG. 2 shows an alternative arrangement of permanent magnets for generating a magnetic guide field with ring-shaped permanent magnets of axial polarization recessed in relation to the bearing face.

In accordance with FIG. 2, a yoke 26 on the rotor and a yoke 29 on the stator face each other coaxially with one another and with the center rotational axis of the motor drive. The respective yokes 26, 29 have ring-shaped recesses 27, 30 axially aligned with each other. The annular recess 30 of the stator is bordered at its center by an assembly of a permanent magnet 31 and a disk 29" made of the same material as the yoke 29, which is affixed coaxially with the centered permanent magnet 31. A step results between the disk 29" and the magnet 31 because of the larger diameter of the permanent magnet 31 in respect to the disk 29". However, it is also possible to bevel the upper edge of the permanent magnet 31, so that the step is reduced. The ring-shaped recess 30 is outwardly bordered by a circular wall of the yoke 29 itself.

The permanent magnet 31 is connected adhesively with the yoke 29 and is centered by means of an annular bead 29''' of the yoke 29. The disk 29" can be connected adhesively in the same way with the permanent magnet 31. However, it is also conceivable to fasten the parts by means of a screw connection.

Magnetic flux lines having a magnetic flux direction as indicated at 28 are formed by this arrangement and essentially form a ring around the axis of rotation 11. The air gap 32 of the bearing between the respective yokes of the rotor and the stator, represented for purposes of clarity to be larger than the actual spacing in the range of a few hundredths of a millimeter which would exist in actual practice, only represents a small magnetic resistance for the portions of the yokes 26 and 29 radially adjacent the opposite lateral sides of the recesses 27 and 30. As a result, a relatively strong magnetic flux can be formed, guided by and conforming to the shape of the yokes as indicated by the magnetic flux lines 28 in FIG. 2. In this connection, it is particularly advantageous that the permanent magnet 31 is spaced apart from the edge 29' of the disk 29" at the bearing face on the stator, whereby both outward faces of the yokes 26 and 29 may be worked by means of grinding or polishing without affecting the permanent magnet 31 which can advantageously be inserted later.

Figure 3:
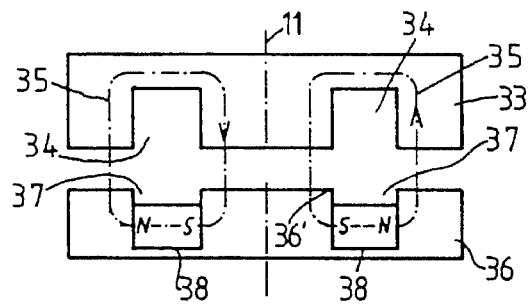
FIG. 3 shows another magnet arrangement as in FIG. 2, but with radial polarization of the ring-shaped permanent magnets.

The embodiment in accordance with FIG. 3 differs from the embodiment represented in FIG. 2 essentially in that the annular guide magnet 38 employed therein is radially magnetized. A yoke 33 on the rotor is disposed in opposed facing relation to a yoke 36 on the stator, with respective recesses 34 and 37 thereof being axially aligned with each other in an analogous manner. The magnetic flux lines 35 of this arrangement form in the shape illustrated. Advantageously, the annular magnet 38 in this embodiment can also be dimensioned in such a way that it is spaced from the bearing face on the stator to permit working thereof. The portion of the yoke 36 facing away from the bearing face is formed of a lesser thickness adjacent the underside of the annular magnet 38 to prevent the formation of a portion of the magnetic flux in this area which would be unusable for the magnetic guide field.

Figure 4:
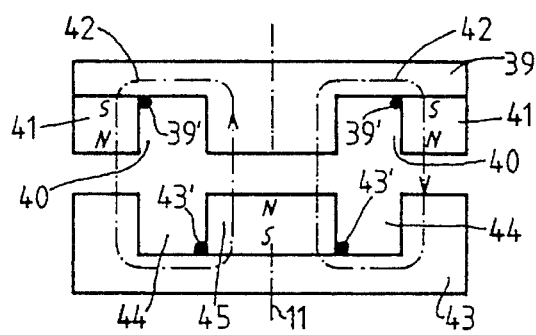
FIG. 4 shows another arrangement for generating a magnetic guide field with magnets of respectively axial polarization disposed on both the stator and rotor sides of the assembly.

In the embodiment represented in FIG. 4, guide magnets are disposed on the rotor as well as on the stator. The yoke 39 on the rotor supports an axially magnetized annular magnet 41 which, together with a central cylindrical portion of the yoke 39, defines a recess 40. The yoke 43 on the stator has a centered permanent magnet 45 which is also axially magnetized, with an annularly-shaped recess 44 being defined between an annular axially-projecting wall of the yoke 43 and the centered permanent magnet 45. Hereagain, magnetic flux lines 42 indicate the magnetic flux direction. It is essential in this case that the arrangement of the magnets is selected such that the magnetic guide fields of the respective magnets reinforce each other. As in the embodiment of FIG. 2, annular beads 39' and 43' are applied to the two yokes 29 and 43 for centering the fastened disposition of the magnets 41 and 45 on the respective yokes.

Figure 5:
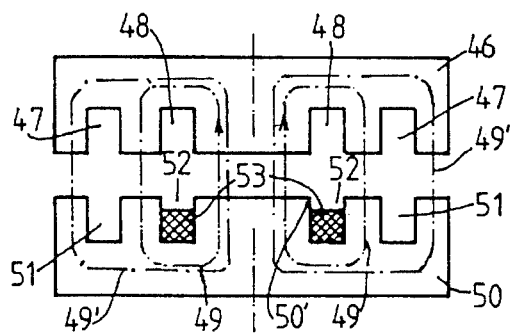
FIG. 5 shows an arrangement for generating a magnetic guide field having several ring-shaped recesses and an electromagnetic coil for generating the magnetic field.

The arrangement illustrated in FIG. 5 differs from the embodiments represented in FIGS. 1–4 in that the yoke 46 on the rotor has two concentric outer and inner annular recesses 47 and 48 and the yoke 50 on the stator is similarly provided with two outer and inner annular recesses 51 and 52. An electromagnetic coil 53 is inserted into the inner recess 52 of the yoke 50 on the stator and is supplied with DC current for excitation of the yokes 46, 50 to generate the appropriate magnetic field in an analogous manner to that of the permanent magnets of FIGS. 1–4. Because of the arrangement of several ring-shaped recesses on both the rotor and the stator, primary and secondary magnetic fields are generated as are represented by primary magnetic flux lines 49 and secondary magnetic flux lines 49'. As will be understood, the same effect can be achieved with a permanent magnet in place of the electromagnetic coil 53.

Figure 6:
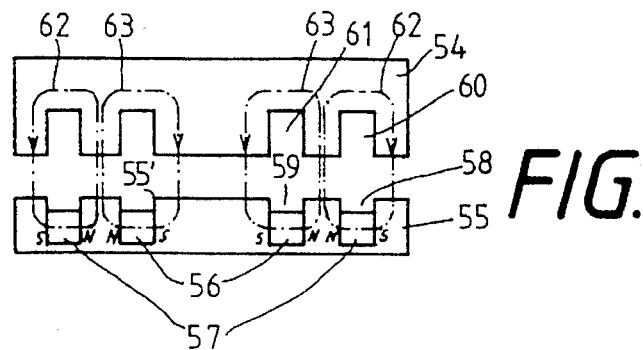
FIG. 6 shows an arrangement for generating magnetic guide field having several ring-shaped recesses and several annular magnets of radial polarization inserted into these ring-shaped recesses.

A further embodiment is represented in FIG. 6 in which, similarly to that of FIG. 5, both a yoke 54 on the rotor and a yoke 55 on the stator have outer and inner recesses 60, 61 and 58, 59, respectively, with each of the recesses 58, 59 in the stator yoke 55 being fitted with annularly-shaped radially polarized permanent magnets 56, 57 in order to increase the number of focused beams of axially extending magnetic fluxes in order to amplify the centering effect of the magnets. As in the other embodiments, the annular magnets 56 and 57 are inserted into the recesses 58 and 59 on the stator at a spacing from its bearing face. Separate magnetic guide fields having magnetic flux lines 62 and 63 are formed by means of this arrangement. As can be seen from the flux directions represented, the magnetic fields generated by the annular magnets 56 and 57 amplify each other.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A rotor assembly for an open end spinning machine comprising an axial field motor having a rotor and a stator wherein the rotor includes a body defining an interior spinning chamber and an outward bearing face and the stator includes a bearing face disposed opposite the bearing face of the rotor, and means for producing a combined magnetic and gas bearing for supporting the rotor at a spacing relative to the stator defined by an intervening air gap, the bearing means including means for producing a field of magnetic flux axially relative to the rotor and the stator, means for conducting the magnetic flux for orienting and maintaining a rotational axis of the rotor in a stationary disposition, wherein the means for producing the field of magnetic flux comprises a magnet disposed on one of the rotor and the stator concentrically to the axis and the magnetic flux conducting means comprises a yoke-forming, magnetically conductive element disposed on the other of the rotor and the stator in axially opposed facing relation to the magnet.

2. A rotor assembly for an open-end spinning machine in accordance with claim 1, further comprising means for producing a second field of magnetic flux, second means comprising elements on the rotor for conducting the second field of magnetic flux for driving the rotor about the axis, and a generally non-magnetic means disposed on the rotor between the first and second magnetic flux conducting means for decoupling of the respective magnetic fluxes.

3. A rotor assembly for an open-end spinning machine in accordance with claim 1, wherein the yoke- forming magnetically conductive element comprises a soft magnetic material.

4. A rotor assembly for an open-end spinning machine in accordance with claim 3, wherein the soft magnetic material is a hysteresis material with a relatively large hysteresis loop.

5. A rotor assembly for an open-end spinning machine in accordance with claim 1, wherein the yoke-forming magnetically conductive element has an annular recess which opens to the respective bearing face of the said other of the rotor and the stator concentrically to the axis.

6. A rotor assembly for an open-end spinning machine in accordance with claim 5, wherein a yoke-forming magnetically conductive element is disposed on each of the rotor and the stator, and each yoke-forming magnetically conductive element has an annular recess, the recesses being axially aligned with each other, the magnet being disposed on one of the yoke-forming magnetically conductive elements.

7. A rotor assembly for an open-end spinning machine in accordance with claim 6, wherein the magnet is axially polarized and is disposed concentrically with and radially inwardly adjacent a respective one of the annular recesses.

8. A rotor assembly for an open-end spinning machine in accordance with claim 6, wherein the magnet is inserted into one of the recesses.

9. A rotor assembly for an open-end spinning machine in accordance with claim 8, wherein the magnet is disposed within the recess at an inward spacing from the location at which it opens at the respective bearing face.

10. A rotor assembly for an open-end spinning machine in accordance with claim 1, wherein the magnet is inserted into the stator.

11. A rotor assembly for an open-end spinning machine in accordance with claim 1, wherein the magnet comprises a first permanent magnet disposed on the rotor and a second permanent magnet disposed on the stator, the first and second magnets being offset radially in respect to each other.

12. A rotor assembly for an open-end spinning machine in accordance with claim 11, wherein the permanent magnets are axially polarized.

13. A rotor assembly for an open-end spinning machine in accordance with claim 1, wherein the magnet comprises a plurality of permanent magnets arranged in respect to the yoke-forming magnetically conductive element to cause the respective magnetic fields to mutually reinforce each other.

* * * * *